US010570796B2

(12) United States Patent
Kurpejovic et al.

(10) Patent No.: US 10,570,796 B2
(45) Date of Patent: Feb. 25, 2020

(54) REACTANT INTRODUCTION DEVICE FOR INTRODUCING REACTANT INTO THE EXHAUST GAS STREAM OF AN INTERNAL COMBUSTION ENGINE

(71) Applicant: Eberspächer Exhaust Technology GmbH & Co. KG, Neunkirchen (DE)

(72) Inventors: Enver Kurpejovic, Kirchheim unter Teck (DE); Oleksandr Semenov, Plochingen (DE); Steffen Glaser, Stuttgart (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 183 days.

(21) Appl. No.: 15/709,949

(22) Filed: Sep. 20, 2017

(65) Prior Publication Data
US 2018/0080360 A1 Mar. 22, 2018

(30) Foreign Application Priority Data
Sep. 21, 2016 (DE) .................. 10 2016 117 746

(51) Int. Cl.
*F01N 3/20* (2006.01)
*F01N 3/28* (2006.01)

(52) U.S. Cl.
CPC ......... *F01N 3/2066* (2013.01); *F01N 3/2892* (2013.01); *F01N 2610/107* (2013.01)

(58) Field of Classification Search
CPC . F01N 3/20; F01N 3/28; F01N 3/2066; F01N 2610/107; F01N 3/2892
See application file for complete search history.

(56) References Cited

U.S. PATENT DOCUMENTS 6,942,838 B1 * 9/2005 Morishita ................ B01J 35/04
422/177
2006/0070374 A1 4/2006 Gaiser et al.
2010/0212301 A1 * 8/2010 De Rudder ........... F01N 3/2066
60/299

(Continued)

FOREIGN PATENT DOCUMENTS

CN 104 879 198 A 9/2015
DE 10 2013 104 579 A1 11/2014

(Continued)

*Primary Examiner* — Patrick D Maines
(74) *Attorney, Agent, or Firm* — McGlew and Tuttle, P.C.

(57) ABSTRACT

A reactant introduction device, for introducing reactant into an exhaust gas stream of an internal combustion engine, includes a reactant introduction housing (16) with a reactant introduction space (20) surrounded by a housing wall (18). The housing wall (18) includes an incoming flow wall area (30) positioned upstream in relation to an exhaust gas flow direction (A), an outgoing flow wall area (32) positioned downstream, in relation to the exhaust gas flow direction (A) and two side wall areas (34, 36) between the incoming flow wall area (30) and the outgoing flow wall area (32). At least one flow-through opening (72, 74, 76) is provided in at least one side wall area (34, 36) or/and in the outgoing flow wall area (32). A reactant injection device (28) injects reactant into the reactant introduction space (20) in a reactant introduction direction (E) onto a heatable reactant release element (48).

20 Claims, 1 Drawing Sheet

(56) References Cited

U.S. PATENT DOCUMENTS

| | | | |
|---|---|---|---|
| 2014/0127100 A1* | 5/2014 | Gerhart | C01C 1/08 423/212 |
| 2015/0101313 A1 | 4/2015 | Mitchell et al. | |
| 2016/0047288 A1* | 2/2016 | Arrowsmith | B01F 5/0473 60/274 |
| 2016/0153334 A1 | 6/2016 | Assalve et al. | |
| 2017/0159526 A1 | 6/2017 | Middelmann | |

FOREIGN PATENT DOCUMENTS

| | | | | |
|---|---|---|---|---|
| DE | 10 2013 210955 A1 | | 12/2014 | |
| DE | 10 2014 108877 A1 | | 12/2015 | |
| DE | 102016206597 A1 | * | 10/2017 | F01N 3/2066 |
| JP | H08-126821 A | | 5/1996 | |
| JP | 2010-84710 A | | 4/2010 | |
| JP | 2012528974 A | | 11/2012 | |
| JP | 2018076801 A | * | 5/2018 | |
| WO | 2006/003868 A1 | | 1/2006 | |
| WO | WO-2006003868 A1 | * | 1/2006 | B01D 53/90 |
| WO | WO-2015197330 A1 | * | 12/2015 | F01N 3/2066 |

\* cited by examiner

REACTANT INTRODUCTION DEVICE FOR INTRODUCING REACTANT INTO THE EXHAUST GAS STREAM OF AN INTERNAL COMBUSTION ENGINE

CROSS REFERENCE TO RELATED APPLICATIONS

This application claims the benefit of priority under 35 U.S.C. § 119 of German Application 10 2016 117 746.6, filed Sep. 21, 2016, the entire contents of which are incorporated herein by reference.

FIELD OF THE INVENTION

The present invention pertains to a reactant introduction device for introducing reactant into the exhaust gas pipe of an internal combustion engine.

BACKGROUND OF THE INVENTION

To reduce the nitrogen oxide level in the exhaust gas in internal combustion engines used in motor vehicles, especially in diesel internal combustion engines, it is known that a catalytic converter device is provided for carrying out a selective catalytic reduction (SCR). Since ammonia is necessary for carrying out this reaction, for example, a urea/water solution is added as a reactant to the exhaust gas flowing in an exhaust system of an internal combustion engine by means of so-called injectors. Uniform mixing of the exhaust gas with reactant injected into same is necessary for an efficient catalytic reaction.

SUMMARY OF THE INVENTION

An object of the present invention is to provide a reactant introduction device for introducing reactant into the exhaust gas pipe of an internal combustion engine, which has a simple configuration and with which efficient mixing of exhaust gas and reactant is achieved by utilizing the flow dynamics of the exhaust gas to be mixed with reactant.

This object is accomplished according to the present invention by a reactant introduction device for introducing reactant into the exhaust gas pipe of an internal combustion engine, comprising a reactant introduction housing with a reactant introduction space surrounded by a housing wall, wherein the housing wall comprises an incoming flow wall area to be positioned upstream of the exhaust gas flow direction, an outgoing flow wall area to be positioned downstream of the exhaust gas flow direction, and two side wall areas between the incoming flow wall area and the outgoing flow wall area, wherein at least one flow-through opening is provided in at least one side wall area or/and in the outgoing flow wall area, and a reactant injection device for injecting reactant into the reactant introduction space in a reactant introduction direction onto a heatable reactant release element.

The reactant introduction device configured according to the present invention utilizes the effect that based on the connection existing via the flow-through opening or the flow-through openings during the flow past the reactant introduction housing or the housing wall thereof, a vacuum present on the outside of the housing wall ensures that reactant injected into the reactant introduction space and again released by the heated reactant release element in the vapor form or reactant reflected by same is suctioned out from the reactant introduction housing by way of a suction pump effect and is efficiently mixed in the process with the exhaust gas flowing past the housing wall. If at least one flow-through opening is especially also provided at the outgoing flow wall area, recirculation of exhaust gas that has already partially mixed with reactant into the reactant introduction space and hence an even better mixing of exhaust gas with reactant are achieved.

Provisions may be made in an embodiment guaranteeing uniform distribution of reactant in the interior of the reactant introduction housing for the reactant introduction housing to be elongated in the direction of a housing longitudinal axis and for the reactant injection device for injecting reactant into the reactant introduction space to be arranged essentially in the direction of the housing longitudinal axis.

To make it possible to reliably guide reactant released by the reactant injection device in the direction of the reactant release element, it is provided that a preferably tubular reactant guide element be associated with the reactant injection device.

At least one and preferably each flow-through opening (the one or more provided flow-through opening(s)) can be shielded with such a reactant guide element against direct discharge of reactant by the reactant injection device from the reactant introduction space. Provisions are preferably made for this for the reactant guide element to overlap at least one and preferably each flow-through opening in the reactant introduction direction at least partly and preferably completely.

Especially if a reactant admission direction essentially corresponds to the direction in which a housing longitudinal axis of the housing wall extends, efficient guiding of the reactant onto the reactant release element can be supported by the reactant guide element extending in the direction of the housing longitudinal axis into the reactant introduction space.

Provisions may be made in an embodiment, which can be manufactured in a simple configuration, for the reactant release element to comprise a reactant release plate heatable by energization with electrical energy.

To make it possible to wet the reactant release plate with the reactant flowing towards the reactant release plate as uniformly as possible, it is provided that the reactant release plate have a reactant release surface oriented essentially at right angles to the reactant introduction direction.

Since the reactant release plate essentially defines the reactant introduction space, it is provided that at least one and preferably each flow-through opening be arranged in the reactant introduction direction between the reactant injection device and the reactant release plate.

To achieve an essentially sealed connection against the passage of reactant or exhaust gas in the connection of the reactant release element to the housing wall, it is provided that a support device supporting the reactant release element without interruptions in the direction of a housing longitudinal axis of the housing wall be provided at the housing wall, or/and that the reactant release element be held without interruption in an insulated manner in relation to an inner side of the housing wall by means of an insulating device preferably in the circumferential direction along the entire housing wall. Provisions may further be made for avoiding heat losses to the outside for the reactant release element to be covered by insulating material essentially completely on a side facing away from the reactant injection device.

To make it possible to utilize the aforementioned suction pump effect generated by generating a vacuum on the outer side of the housing wall while compromising the exhaust gas flow as little as possible, provisions may be made for the reactant introduction housing to be flattened, such that the distance between the incoming flow wall area and the outgoing flow wall area is greater than the distance between the side wall areas. For example, the reactant introduction housing may be configured with an elliptical, oval or drop-shaped cross-sectional profile in relation to a housing longitudinal axis.

The present invention further pertains to an exhaust system for an internal combustion engine, comprising an exhaust pipe, through which exhaust gas can flow in an exhaust gas flow direction, and a reactant introduction device in said exhaust pipe, which reactant introduction device is configured according to the principles of the present invention and past which exhaust gas flowing in said exhaust pipe flows.

The reactant introduction device may be arranged in the exhaust pipe such that the housing longitudinal axis of the reactant introduction housing is oriented essentially at right angles to the exhaust gas flow direction, such that the incoming flow wall area forms an upstream end area of the housing wall, the outgoing flow wall area forms a downstream end area of the housing wall, and the side wall areas extend essentially in the exhaust gas flow direction between the incoming flow wall area and the outgoing flow wall area.

To make it possible to provide for the mixing effect according to the present invention during the flow past the housing wall on both sides, it is provided that flow-through openings be provided opposite each other in the side wall areas essentially at right angles to the exhaust gas flow direction, or/and that at least one flow-through opening be provided in at least one vertex area of the side wall areas.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
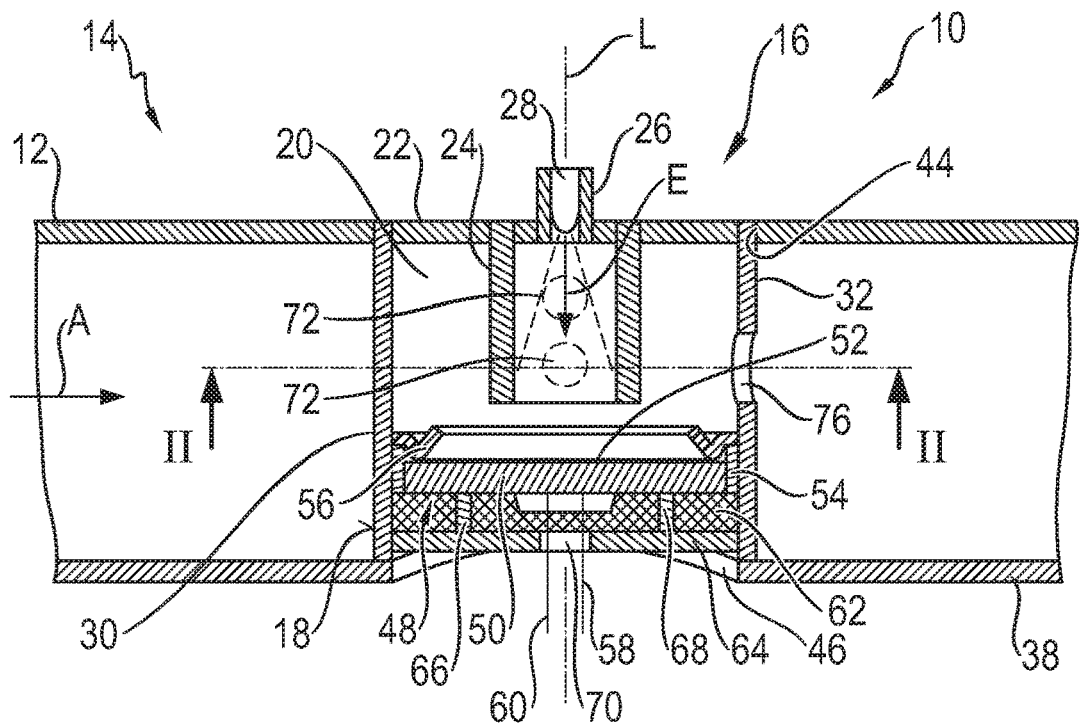
FIG. 1 is a partial longitudinal sectional view of an exhaust system of an internal combustion engine, which exhaust system is configured with a reactant introduction device.
Figure 2:
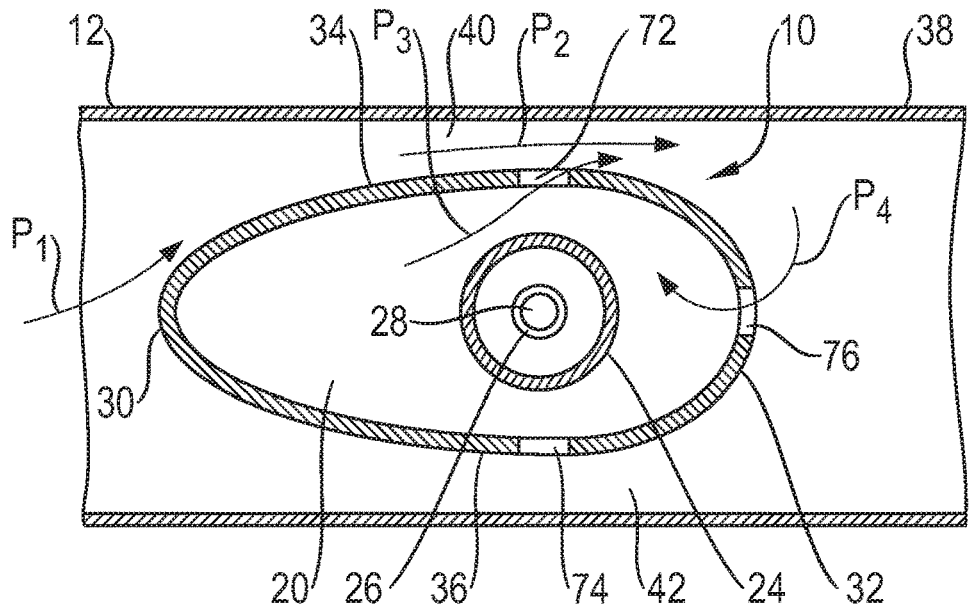
FIG. 2 is view of an exhaust gas admission device in an exhaust pipe, which view corresponds to a sectional view along a line II-II in FIG. 1.

Referring to the drawings, a reactant introduction device is generally designated by 10 in FIGS. 1 and 2. The reactant introduction device is used to admit liquid reactant, e.g., a urea/water solution, into the exhaust gas stream discharged by an internal combustion engine, for example, in a motor vehicle. The reactant introduction device 10 is arranged for this purpose in an exhaust pipe of an exhaust system 14 of an internal combustion engine, which said exhaust pipe is generally designated by 12.

The reactant introduction device 10 comprises a reactant introduction housing 16 with a housing wall 18 elongated, for example, essentially cylindrically in the direction of a housing longitudinal axis L. A comparison of FIGS. 1 and 2 shows that the housing wall 18 may have different cross-sectional profiles. While a configuration with an essentially symmetrical cross-sectional profile in relation to the housing longitudinal axis L, for example, a cross-sectional profile with an elliptical contour, is shown in FIG. 1, the housing wall 18 shown in FIG. 2 has an oval profile elongated at right angles to the housing longitudinal axis. Other cross-sectional profiles, e.g., a drop shape, may be selected as well.

A reactant introduction space 20 formed in the reactant introduction housing 16 or surrounded by the housing wall 18 is closed in an axial direction, axially in relation to the housing longitudinal axis L, by a plate-like or cover-like closing element 22. A reactant guide element 24, which is, for example, tubular, and, via an attachment 26, a reactant injection device 28, for example, an injector, are carried on this closing element 22. The reactant injection device 28 and the tubular reactant guide element 24 may be arranged essentially concentrically in relation to one another, as can be seen in FIG. 2. The reactant injection device 28 is arranged such that the reactant released by it has a reactant introduction direction E that is directed essentially in the direction of the housing longitudinal axis L. Since the reactant is injected, in general, in the form of a spray, a spray cone will form, in which the reactant droplets thus released are assumed, according to the principles of the present invention, to have a main flow direction component directed in the reactant introduction direction E.

The housing wall 18 of the reactant introduction housing 16 is arranged with its flattened cross-sectional profile in the exhaust pipe 12 such that an incoming flow wall area 30 is positioned upstream in relation to an exhaust gas flow direction A of the exhaust gas flowing in the exhaust pipe 12, while an outgoing flow wall area 32 is positioned downstream. The incoming flow wall area 30 thus forms the upstream end area of the housing wall 18, and the outgoing flow wall area 32 forms the downstream end area of the housing wall 18. Side wall areas 34, 36 located opposite each other extend between the incoming flow wall area 30 and the outgoing flow wall area 32, which comprise the respective wall areas with the smaller radius of curvature. The side wall areas 34, 36 extend approximately in the exhaust gas flow direction A and likewise have a curved configuration each following the incoming flow wall area 30 and the outgoing flow wall area 32. As is indicated by a flow arrow P1, the exhaust gas flowing towards the housing wall 18 in the exhaust gas flow direction A is deflected at the incoming flow wall area 30, the deflection taking, of course, place towards both sides. The exhaust gas then flows, as is indicated by the flow arrow P2, along the two side walls 34, 36 in a respective flow space 40, 42 formed between the side walls 34, 36 and a pipe wall 38 of the exhaust pipe 12.

Associated with the reactant introduction housing 16, openings 44, 46, preferably adapted to the circumferential contour of the housing wall 18, are formed in the pipe wall 38 of the exhaust pipe 12 on two mutually opposite sides. The opening 44 is dimensioned, for example, such that the housing wall 18 can be pushed through this opening 44 into the exhaust pipe 12 with a close fit. The opening 46 is dimensioned such that it essentially corresponds to the cross-sectional profile of the reactant introduction space 20 defined by the housing wall 18, so that with the reactant introduction housing 16 pushed completely into the exhaust pipe 12, the housing wall 18 is in contact with the pipe wall 38 in the area surrounding the opening 46. The housing wall 18 may be connected to the pipe wall 38 of the exhaust pipe 12 in the area of both openings 44, 46 by connection in substance, for example, by welding, soldering or bonding, in a gas-tight and heat-resistant manner. The closing element 22 may also be connected in a corresponding manner to the housing wall 18 in order to close the reactant introduction space 20 to the outside in a gas-tight and heat-resistant manner in this area as well.

Located opposite the reactant injection device 28 and the reactant guide element 24 in the reactant introduction direction E, a reactant release element 48, for example, in the form of a reactant release plate 50, is arranged in the reactant introduction housing 16. The reactant release plate 50 has a reactant release surface 52, which can be wetted by the reactant released by the reactant injection device 28 and is oriented essentially at right angles to the reactant introduction direction. In its circumferential edge area, the reactant release plate 50 is supported radially outwardly by an insulating device 54, which preferably completely surrounds it in a ring-shaped manner, in relation to the housing wall 18, on the one hand, and, on the other hand, it insulates same in relation to this [housing wall]. A support device 56, which has a ring-shaped configuration and on which the reactant release plate 50 can be supported in the direction of the reactant injection device 28, is carried on the housing wall 18. The support device 56 preferably extends without interruptions over the entire circumference of the housing wall 18, so that a corresponding supporting contact can be provided between the reactant release plate 50 and the support device 56 over the entire circumference essentially without interruptions and leakage of reactant wetting the reactant release surface 52 from said reactant release surface in the direction of the insulating device 54 is essentially prevented. The support device 56 may be connected to the housing wall 18, for example, at a plurality of discrete circumferential areas, for example, by welding or soldering in order to avoid heat losses from the reactant release plate 50 towards the housing wall 18 in this area to the extent possible.

The reactant release element 48 comprising the reactant release plate 50 can be heated by energization with electrical energy. For example, an electrically energizable heating element may be embedded for this in the material of which the reactant release plate 50 is made. As an alternative or in addition, such an electrically energizable heating element may be provided on the rear side of the reactant release plate 50, which is positioned facing away from the reactant injection device 28, but optionally also in the area of the reactant release surface 52. The electrically energizable heating element associated with the reactant release plate 50 may be connected to a power source via electric lines 58, 60 in order to thus heat the reactant release plate 50 during the operation. The reactant being sprayed in the form of droplets by the reactant injection device 28 in the direction of the reactant release surface 52 thus reaches the reactant release surface 52. Some of the reactant reaching this reactant release surface 52 in the form of droplets may be reflected from the reactant release surface 52 and it will thus also be present in the form of droplets in the reactant introduction space 20. Most of the reactant reaching the reactant release surface 52 will wet this surface and will again be released in the form of vapor by the reactant release surface 52 into the reactant introduction space 20 because of the heating of the reactant release plate 50. To also avoid heat losses on the rear side of the reactant release plate 50 in the process, this plate may preferably be covered essentially completely with insulating material 62. Another plate-like or cover-like closing element 64, which presses the reactant release plate 50 against the support device 56 via a plurality of support elements 66, 68 and is fixed at the housing wall 18 in a gas-tight and heat-resistant manner, for example, by connection in substance, e.g., welding, soldering or bonding, may be provided on the rear side of the insulating material 62. The lines 58, 60 can be led out of the area of the reactant introduction device 10 or the exhaust pipe 12 through an opening 70 in the closing element 64 and the opening 46 in the pipe wall 38.

A plurality of flow-through openings are provided in the housing wall 18 of the reactant introduction housing 16. For example, respective flow-through openings 72, 74 are provided in the two side walls 34, 36, preferably in areas located mutually opposite each other in relation to the housing longitudinal axis L. As is shown in FIG. 1, a plurality of such flow-through openings 72 and 74, respectively, may be provided in each of the side walls 34, 36, for example, such that these follow each other in the direction of the reactant injection direction E and are located at essentially the same level in the direction of the exhaust gas flow direction A. A flow-through opening 76 is provided in the outgoing flow wall area 32 in the exemplary embodiment shown. The flow-through openings 72, 74, 76 are positioned such that the tubular reactant guide element 24, which extends into the reactant introduction space 20 starting from the area of the reactant injection device 28, overlaps the flow-through openings 72, 74, 76 essentially completely and prevents the direct passage of reactant released from the reactant injection device 28 through one of the flow-through openings 72, 74, 76. It is thus guaranteed by the reactant guide element 24 that essentially the total quantity of the reactant released from the reactant injection device 28 will reach the reactant release plate 50 and is again released by the latter in the direction of the reactant introduction space 20.

Based on the deflection of the exhaust gases at the incoming flow wall area 30 and in the upstream areas of the side wall areas 34, 36, the exhaust gas is guided into the flow spaces 40, 42 during the operation of an internal combustion engine and with the exhaust gas flowing past the housing wall 18. The flow cross section area available for the flow-through now decreases up to the vertex areas of the side walls 34, 36, in which vertex areas the flow-through openings 72, 74 of the side walls 34, 36 are preferably provided. Based on the decreasing flow cross-sectional area, the flow velocity of the exhaust gas flowing through the intermediate flow spaces 40, 42 increases in this area. An increasing flow velocity leads to increasing dynamic pressure and correspondingly to a decreasing static pressure of the exhaust gas. This means that a vacuum builds up in relation to the pressure present in the reactant introduction space 20 in the area of the flow-through openings 72, 74 in the intermediate flow spaces 40, 42. This causes gas, which is present in the reactant introduction space 20 and is contained in the reactant, to be suctioned out of the reactant introduction space 20, as is indicated by a flow arrow P3, and to be mixed with the exhaust gas flowing past the reactant introduction housing 16 outside said reactant introduction housing. Since only a part of the material flowing out of the reactant introduction space 20 via the flow-through openings 72, 74 will be reactant, a vacuum would develop based on this suction pump effect in the reactant introduction space. However, since the reactant introduction space 20 is also open in the area of the flow-through opening 76 in the outgoing flow wall area 32, a recirculation of exhaust gas mixed with reactant from the exhaust pipe 12 into the reactant introduction space 20 can take place here, as is indicated by a flow arrow P4. This means that the reactant released by the reactant injection device 28 or by the reactant release plate 50 will be mixed with a mixture of exhaust gas and reactant, which enters the reactant introduction space 20, in the reactant introduction space 20, and, as is indicated by the flow arrow P3, is suctioned off from this [space] and is mixed with the exhaust gas stream. This contributes to an efficient, uniform mixing of exhaust gas and reactant, so that the selective catalytic reduction can take place effectively downstream of the reactant introduction device 10 in a catalytic converter device positioned there in the exhaust gas stream.

Various advantages are gained during the operation with the above-described reactant introduction device 10, which is shown in the figures. On the one hand, it is guaranteed by the heat insulation of the reactant release plate 50 that heat losses can extensively be avoided in this area, so that efficient evaporation of the reactant can already be achieved even at comparatively low temperatures and efficient addition of reactant can thus be guaranteed even at low exhaust gas temperatures below 200° C. On the other hand, the reactant introduction housing 16 can remove heat from the exhaust gas flowing past said housing via the housing wall 18, so that reliable heating is ensured during the continuous operation. It is guaranteed by the positioning of the flow-through openings 72, 74, 76, on the one hand, and by the dimensioning and positioning of the tubular reactant guide elements 24, on the other hand, that direct discharge of reactant from the reactant introduction space 20 cannot essentially take place. After first reaching the reactant release plate 50, the reactant is first mixed in the reactant introduction space 20 with gas that is present there, for example, via exhaust gas having entered via the flow-through opening 76 and already containing a percentage of reactant, and it is released into the exhaust gas stream via the flow-through openings 72, 74 only thereafter.

It should be noted that the principles of the present invention can, of course, also be applied in the configuration of the reactant introduction device that is varied in relation to the embodiment shown and described. As was already described above, the cross-sectional profiling of the housing wall may thus be different, especially taking flow dynamic aspects into account. The number and the positioning of the flow-through openings may also be selected differently. While the positioning of the flow-through openings in the side walls in the area in which the exhaust gas flowing past the housing wall has a maximum flow velocity is especially advantageous based on the now efficient suction pump effect, it is also possible, as an alternative or in addition, to provide flow-through openings farther downstream or/and upstream in the side walls or in at least one side wall. A plurality of flow-through openings may also be provided in the area of the outgoing flow wall area. As an alternative, it is possible to do without providing a flow-through opening in the outgoing flow wall area. Even though the configuration of the incoming flow wall area without flow-through opening is especially advantageous for the flow conditions, at least one flow-through opening may also be positioned, as an alternative or in addition, in the incoming flow wall area or in an area of the side wall areas located farther upstream.

By selecting the positioning of the support device for the reactant release plate in the direction of the housing longitudinal axis, the positioning of the reactant release plate in the interior of the reactant release housing can be selected such that it is adapted to the configuration of a respective exhaust gas-guiding system. The embodiment of the reactant release plate may also differ from the shape shown. Thus, a grid-like structure or a porous structure could also be selected here for the plate in order to enlarge the surface available for receiving and also for releasing reactant. An undulated structure or a structure provided with elevations is also possible for the reactant plate.

While specific embodiments of the invention have been shown and described in detail to illustrate the application of the principles of the invention, it will be understood that the invention may be embodied otherwise without departing from such principles.

What is claimed is:

1. A reactant introduction device for introducing reactant into the exhaust gas stream of an internal combustion engine, the reactant introduction device comprising:
   a reactant introduction housing elongated in a direction of a housing longitudinal axis and comprising a housing wall extending along the housing longitudinal axis such as to surround a reactant introduction space, wherein the housing wall comprises an incoming flow wall area to be positioned upstream in relation to an exhaust gas flow direction of an exhaust gas flow directed towards the reactant introduction housing, an outgoing flow wall area to be positioned downstream in relation to the exhaust gas flow direction and a first side wall area between the incoming flow wall area and the outgoing flow wall area and a second side wall area between the incoming flow wall area and the outgoing flow wall area, wherein a flow-through opening is provided in the outgoing flow wall area or in the first side wall area or in the second side wall area or in any combination of in the outgoing flow wall area, in the first side wall area and in the second side wall area;
   a heatable reactant release element; and
   a reactant injection device for injecting reactant into the reactant introduction space in a reactant introduction direction towards the heatable reactant release element, the reactant injection device being arranged for injecting reactant in the direction of the housing longitudinal axis.

2. A reactant introduction device in accordance with claim 1, further comprising a tubular reactant guide element associated with the reactant injection device.

3. A reactant introduction device in accordance with claim 2, wherein the reactant guide element shields the provided flow-through opening against direct discharge of reactant from the reactant injection device from the reactant introduction space.

4. A reactant introduction device in accordance with claim 3, wherein the reactant guide element at least partially overlaps the provided flow-through opening in a reactant introduction direction.

5. A reactant introduction device in accordance with claim 2, wherein
   the reactant guide element extends in the direction of the housing longitudinal axis into the reactant introduction space.

6. A reactant introduction device in accordance with claim 1, wherein the reactant release element comprises a reactant release plate heatable by energization with electrical energy.

7. A reactant introduction device in accordance with claim 6, wherein the reactant release plate comprises a reactant release surface oriented at right angles to a reactant introduction direction.

8. A reactant introduction device in accordance with claim 6, wherein the provided flow-through opening is arranged between the reactant injection device and the reactant release plate with respect to a reactant introduction direction.

9. A reactant introduction device in accordance with claim 1, further comprising a support device provided at the housing wall, the support device supporting the reactant release element without interruption in a direction of a housing longitudinal axis of the housing wall or in a circumferential direction along a region of the housing wall or in a combination of a direction of a housing longitudinal axis of the housing wall and a circumferential direction along a region of the housing wall.

10. A reactant introduction device in accordance with claim 1, further comprising an insulating device holding the reactant release element so as to be insulated in relation to an inner side of the housing wall.

11. A reactant introduction device in accordance with claim 10, wherein the reactant introduction housing is configured with an elliptical cross-sectional profile in relation to a housing longitudinal axis or an oval cross-sectional profile in relation to the housing longitudinal axis or a drop-shaped cross-sectional profile in relation to the housing longitudinal axis.

12. A reactant introduction device in accordance with claim 1, further comprising insulating material positioned on a side of the reactant release element facing away from the reactant injection device.

13. A reactant introduction device in accordance with claim 1, wherein the reactant introduction housing has a flattened shape with a distance between the incoming flow wall area and the outgoing flow wall area that is greater than a distance between the first side wall area and the second side wall area.

14. An exhaust system for an internal combustion engine, the exhaust gas system comprising:
 an exhaust pipe, through which exhaust gas can flow in an exhaust gas flow direction; and
 a reactant introduction device positioned in the exhaust pipe such that exhaust gas flowing in the exhaust pipe can flow past the reactant introduction device, the reactant introduction device comprising:
  a reactant introduction housing elongated in a direction of a housing longitudinal axis and comprising a housing wall extending along the housing longitudinal axis such as to surround a reactant introduction space, wherein the housing wall comprises an incoming flow wall area positioned upstream in relation to the exhaust gas flow direction of an exhaust gas flow directed towards the reactant introduction housing, an outgoing flow wall area positioned downstream in relation to the exhaust gas flow direction and a first side wall area between the incoming flow wall area and the outgoing flow wall area and a second side wall area between the incoming flow wall area and the outgoing flow wall area, wherein a flow-through opening is provided in the outgoing flow wall area or in the first side wall area or in the second side wall area or in any combination of in the outgoing flow wall area, in the first side wall area and in the second side wall area;
  a heatable reactant release element; and
  a reactant injection device for injecting reactant into the reactant introduction space in a reactant introduction direction towards the heatable reactant release element, the reactant injection device being arranged for injecting reactant in the direction of the housing longitudinal axis.

15. An exhaust system in accordance with claim 14, wherein the reactant introduction device is arranged in the exhaust pipe such that a housing longitudinal axis of the reactant introduction housing is oriented at right angles, such that the incoming flow wall area forms an upstream end area of the housing wall, the outgoing flow wall area forms a downstream end area of the housing wall and the side wall areas extend in the exhaust gas flow direction between the incoming flow wall area and the outgoing flow wall area.

16. An exhaust system in accordance with claim 15, wherein the provided flow-through opening comprises a first flow through opening on the first side wall area and a second flow through opening on the second side wall area such that the first flow through opening and the second flow through opening are located opposite each other at right angles.

17. An exhaust system in accordance with claim 15, wherein the provided flow-through opening comprises a first flow-through opening in a vertex area of the first side wall area and a second flow-through opening in a vertex area of the second side wall area.

18. An exhaust system in accordance with claim 15, further comprising a reactant guide element associated with the reactant injection device, wherein the reactant guide element shields the provided flow-through opening against direct discharge of reactant from the reactant injection device from the reactant introduction space.

19. An exhaust system in accordance with claim 15, further comprising at least one of:
 a support device provided at the housing wall, the support device supporting the reactant release element without interruption in a direction of a housing longitudinal axis of the housing wall or in a circumferential direction along a region of the housing wall or in a combination of a direction of a housing longitudinal axis of the housing wall and a circumferential direction along a region of the housing wall;
 an insulating device holding the reactant release element so as to be insulated in relation to an inner side of the housing wall; and
 insulating material positioned on a side of the reactant release element facing away from the reactant injection device.

20. An exhaust system for an internal combustion engine, the exhaust gas system comprising:
 an exhaust pipe with an exhaust pipe wall at least partially defining an exhaust gas flow path for a flow of exhaust gas in an exhaust gas flow direction; and
 a reactant introduction device positioned in the exhaust pipe in the exhaust gas flow path, the reactant introduction device comprising:
  a reactant introduction housing connected to the exhaust pipe wall at a first connection location and connected to the exhaust pipe wall at a second connection location and elongated in a direction of a reactant introduction housing longitudinal axis and extending between the first connection location and the second connection location, the reactant introduction housing comprising a housing wall extending along the direction of the reactant introduction housing longitudinal axis, with an interior surface of the housing wall defining a reactant introduction space in an interior of the housing wall and with an exterior of the housing wall exposed to gas flowing in the exhaust pipe along the gas flow path, whereby the exhaust gas flow path extends around the housing and past the reactant introduction device, wherein the housing wall comprises an incoming flow wall area positioned facing upstream in relation to the exhaust gas flow direction, an outgoing flow wall area positioned facing downstream in relation to the exhaust gas flow direction, a first side wall area between the incoming flow wall area and the outgoing flow wall area and a second side wall area between the incoming flow wall area and the outgoing flow wall area, wherein the first side wall area is spaced away from the exhaust pipe wall and the second side wall area is spaced away from the exhaust pipe wall and wherein a flow-through opening is provided in the outgoing flow wall area or in the first side wall area or in the second side wall area or in any combination of in the outgoing flow wall area, in the first side wall area and in the second side wall area;
a heatable reactant release element at least partially within the reactant introduction space; and
a reactant injection device connected to the exhaust pipe for injecting reactant into the reactant introduction space in a reactant introduction direction that is in the reactant introduction housing longitudinal axis direction and is towards the heatable reactant release element.

\* \* \* \* \*